(12) United States Patent
Knoll et al.

(10) Patent No.: US 8,580,226 B2
(45) Date of Patent: Nov. 12, 2013

(54) SYNTHESIS OF SODIUM TITANATE AND ION EXCHANGE USE THEREOF

(75) Inventors: James A. Knoll, Lebanon Township, NJ (US); Nichole Pennisi, Middletown, DE (US); Peter A Yarnell, Sellersville, PA (US)

(73) Assignee: Graver Technologies, LLC, Glasgow, DE (US)

( * ) Notice: Subject to any disclaimer, the term of this patent is extended or adjusted under 35 U.S.C. 154(b) by 524 days.

(21) Appl. No.: 12/916,002

(22) Filed: Oct. 29, 2010

(65) Prior Publication Data

US 2012/0103911 A1     May 3, 2012

(51) Int. Cl.
*C01G 23/00* (2006.01)

(52) U.S. Cl.
USPC .......................... 423/598; 210/660; 210/688

(58) Field of Classification Search
USPC .................................. 423/598; 210/660, 688
See application file for complete search history.

(56) References Cited

U.S. PATENT DOCUMENTS

| | | | | |
|---|---|---|---|---|
| 2,833,620 | A | * | 5/1958 | Gier et al. .................. 423/598 |
| 2,841,470 | A | * | 7/1958 | Berry ......................... 423/598 |
| 4,161,513 | A |   | 7/1979 | Forberg et al. |
| 5,840,111 | A |   | 11/1998 | Wiederhöft et al. |
| 5,885,925 | A |   | 3/1999 | DeFilippi et al. |
| 6,106,799 | A |   | 8/2000 | Lehto et al. |
| 6,268,307 | B1 |   | 7/2001 | DeFilippi et al. |
| 6,919,029 | B2 |   | 7/2005 | Meng et al. |
| 7,473,369 | B2 |   | 1/2009 | Meng et al. |
| 7,494,640 | B1 |   | 2/2009 | Nyman et al. |
| 7,497,952 | B2 |   | 3/2009 | Meng et al. |
| 7,521,394 | B2 |   | 4/2009 | Xie et al. |
| 2001/0042719 | A1 |   | 11/2001 | Levy |
| 2005/0106095 | A1 |   | 5/2005 | Manorama et al. |
| 2005/0191492 | A1 |   | 9/2005 | Yadav |
| 2005/0214200 | A1 |   | 9/2005 | Surender et al. |
| 2005/0233146 | A1 |   | 10/2005 | Nonninger |
| 2006/0091079 | A1 |   | 5/2006 | Meng et al. |
| 2006/0144793 | A1 |   | 7/2006 | Dadachov |
| 2006/0171877 | A1 |   | 8/2006 | Dadachov |
| 2006/0188431 | A1 |   | 8/2006 | Pan et al. |
| 2008/0031806 | A1 |   | 2/2008 | Gavenonis et al. |
| 2008/0159933 | A1 |   | 7/2008 | Corbin et al. |
| 2008/0187684 | A1 |   | 8/2008 | Hu et al. |
| 2008/0268148 | A1 |   | 10/2008 | Prochazka et al. |
| 2008/0279760 | A1 |   | 11/2008 | Torardi |
| 2008/0299036 | A1 |   | 12/2008 | Vitner et al. |
| 2009/0095691 | A1 |   | 4/2009 | Thorpe |
| 2009/0104086 | A1 |   | 4/2009 | Zax et al. |
| 2009/0117028 | A1 |   | 5/2009 | Kundu |
| 2009/0175757 | A1 |   | 7/2009 | Yao et al. |
| 2009/0252693 | A1 |   | 10/2009 | Baldi et al. |

FOREIGN PATENT DOCUMENTS

JP        02167822 A  *  6/1990

* cited by examiner

*Primary Examiner* — Chester Barry
(74) *Attorney, Agent, or Firm* — DLA Piper LLP US; Jennifer E. Lacroix, Esq.

(57) ABSTRACT

This invention relates to a process for producing a sodium titanate that can be utilized in an ion exchange media. The sodium titanate ion exchange media can be subsequently used to remove contaminants such as metals from water in a variety of applications. The sodium titanate can be synthesized by utilizing a source of titanium that includes a nano-crystalline titanium having a mean primary crystallite diameter of about 1 nm to about 30 nm.

20 Claims, 3 Drawing Sheets

SYNTHESIS OF SODIUM TITANATE AND ION EXCHANGE USE THEREOF

BACKGROUND

The present technology relates to a process for producing sodium titanate and sodium titanate ion exchange media, preferably from nano-crystalline titanium dioxide. The sodium titanate ion exchange media can be subsequently used to remove contaminants such as metals from water in a variety of applications.

Various methods of producing sodium titanates from liquid, solid and semi-solid titanium sources are known. When a solid source has been used, it has required an "exotic" solid sesqui-oxide of titanium as well as autoclave temperatures and pressures.

The removal of metals from water and process solutions is currently achieved through many means including the use organic or inorganic ion exchange as well as adsorbent media. Lead reduction in drinking water is specifically accomplished through the use of weakly acidic acrylic-based cation exchange resins when a large particle (500+ um) can be employed. When a powdered adsorbent/exchanger is employed (<100 um), as in a carbon block filter, this same ion exchange resin is avoided due to its propensity to shrink and swell upon hydration and when changing ionic forms. Inorganic exchangers and adsorbents experience less "size change" under these conditions. These materials include but are not limited to titano-silicate and metal oxide media. Sodium titanates have not traditionally been used in this application.

BRIEF SUMMARY

The present technology relates to a process for producing sodium titanate and sodium titanate ion exchange media. Preferably, the sodium titanate ion exchange media can be used for water and process solution treatment.

In one aspect, a method of synthesizing sodium titanate is provided that includes: providing at least one source of titanium that includes nano-crystalline titanium having a mean primary crystallite diameter of about 1 nm to about 30 nm; providing at least one source of sodium oxide; forming a reaction mixture that includes the at least one source of titanium and the at least one source of sodium oxide in a suitable solvent; and reacting the components of the reaction mixture to produce a reaction product that includes sodium titanate having a particle size ranging from 1 micron to 100 microns.

In another aspect, a method of removing contaminants from water is provided that includes: providing an ion exchange medium to a treatment vessel, the ion exchange medium comprising sodium titanate; providing water from a water source to the treatment vessel; and passing the water through the sodium titanate ion exchange medium in the treatment vessel to remove at least one contaminant. The sodium titanate as the ion exchange medium can be synthesized by: providing at least one source of titanium that includes nano-crystalline titanium having a mean primary crystallite diameter of about 1 nm to about 30 nm; providing at least one source of sodium oxide; forming a reaction mixture that includes at least one source of titanium and the at least one source of sodium oxide in a suitable solvent; and reacting the components of the reaction mixture to produce a reaction product that includes sodium titanate having a particle size ranging from 1 micron to 100 microns and subsequent agglomeration products having a particle size range from 1 mm to 4 mm.

BRIEF DESCRIPTION OF SEVERAL VIEWS OF THE DRAWINGS

Specific examples have been chosen for purposes of illustration and description, and are shown in the accompanying drawings, forming a part of the specification.

DETAILED DESCRIPTION

Figure 1:
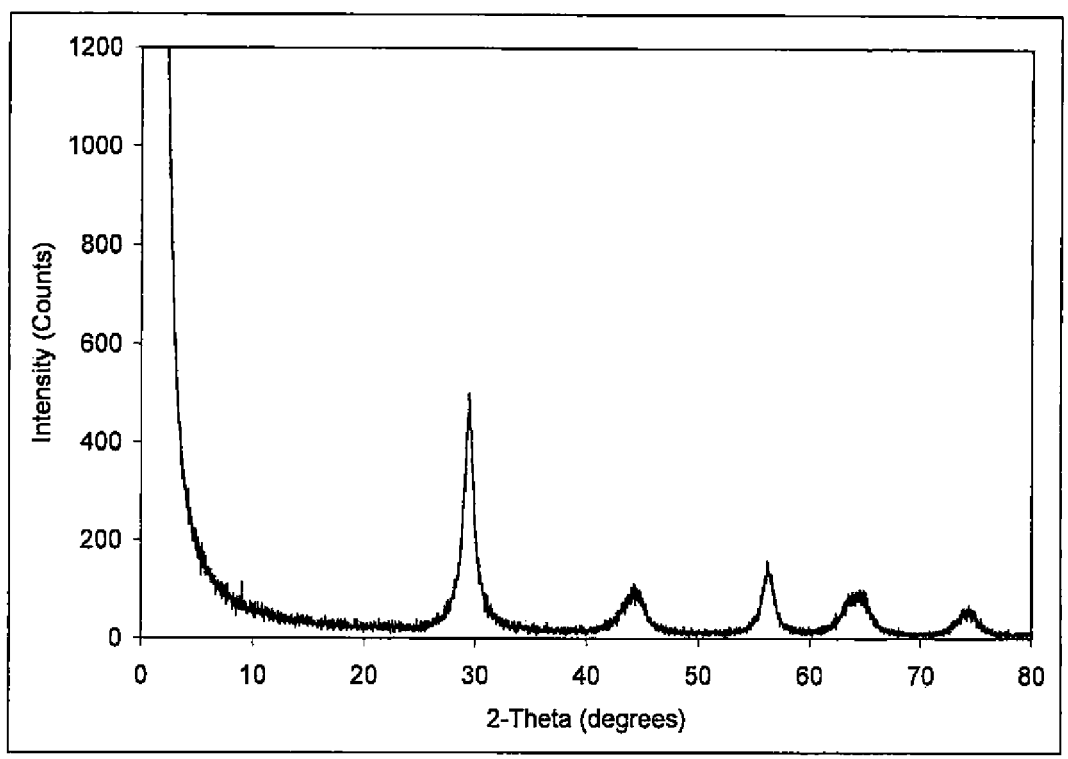
FIG. 1 illustrates an XRD plot of titanium dioxide ($TiO_2$), showing the peaks associated therewith.

Sodium titanate of the present technology can be prepared by providing at least one source of titanium, providing at least one source of sodium oxide, and reacting the source of titanium and the source of sodium oxide under suitable conditions to produce sodium titanate.

The titanium source can include or consist essentially of solid nano-crystalline titanium, which can be a titanium oxide or a titanium hydroxide. Nano-crystalline refers to a solid having a mean primary crystallite diameter within the range of about 1 nm to about 30 nm. One example of a preferred source of titanium that is a titanium oxide is nano-crystalline titanium dioxide. Nano-crystalline titanium dioxide can be prepared in any suitable manner, including, but not limited to the methods described in U.S. Pat. No. 6,919,029 to Meng et al., the disclosure of which is hereby incorporated by reference in its entirety, which can provide a surface activated titanium oxide product having an anatase crystal structure. Such methods for producing nano-crystalline titanium dioxide can include, for example, preparing a titanium oxide precipitate from a mixture comprising a hydrolysable titanium compound and heating (or drying) the titanium oxide precipitate at a selected drying temperature of less than 300° C., without including a calcining step.

The source of sodium oxide can include sodium hydroxide, sodium silicate, or an alkali metal hydroxide. For example, suitable commercially available sources of sodium oxide can include from about 37 wt % to about 45 wt % solutions of sodium silicate with a silicon dioxide to sodium oxide ratio of from 1:1 to 4:1, which are available under the trade names StixsoRR, Star, SS-22, RU, OW, O, N, M, E, and D brands from PQ Corp, as well as Sodium Silicates from Dow Chemical, Spectrum Chemical and OxyChem. Another source of sodium oxide can be a solution or solid having sodium hydroxide in an amount from about 4 wt % to about 100 wt %.

Prior to being reacted, the source of titanium and the source of sodium oxide can be combined by forming a reaction mixture that includes both the source of titanium and the source of sodium oxide in a suitable solvent. The synthesis procedure can include reacting the components of the reaction mixture under conditions suitable to produce a reaction product that includes sodium titanate.

For example, the reaction step of the synthesis procedure can include heating the reaction mixture to a reaction temperature for a reaction period having a suitable length of time, and can also include stirring the reaction mixture during the reaction period, preferably with high shear mixing. The high sheer mixing can be conducted by utilizing any suitable high shear mixer, including, for example, an inline high shear mixer or a batch high shear mixer. The reaction temperature is preferably from about 50° C. to about 140° C., or from about 70° C. to about 110° C., including but not limited to 75° C., 80° C., 85° C., 90° C., 95° C., 100° C., 105° C., and 110° C. The reaction period can be, for example, from about 1 hours to about 60 hours, or from about 2 to 30 hours, including but not limited to 4 hours, 6 hours, 8 hours, 10 hours, 12 hours, 14 hours, 16 hours, 18 hours, 20 hours, 22 hours, 24 hours, 26 hours, and 28 hours.

Figure 2:
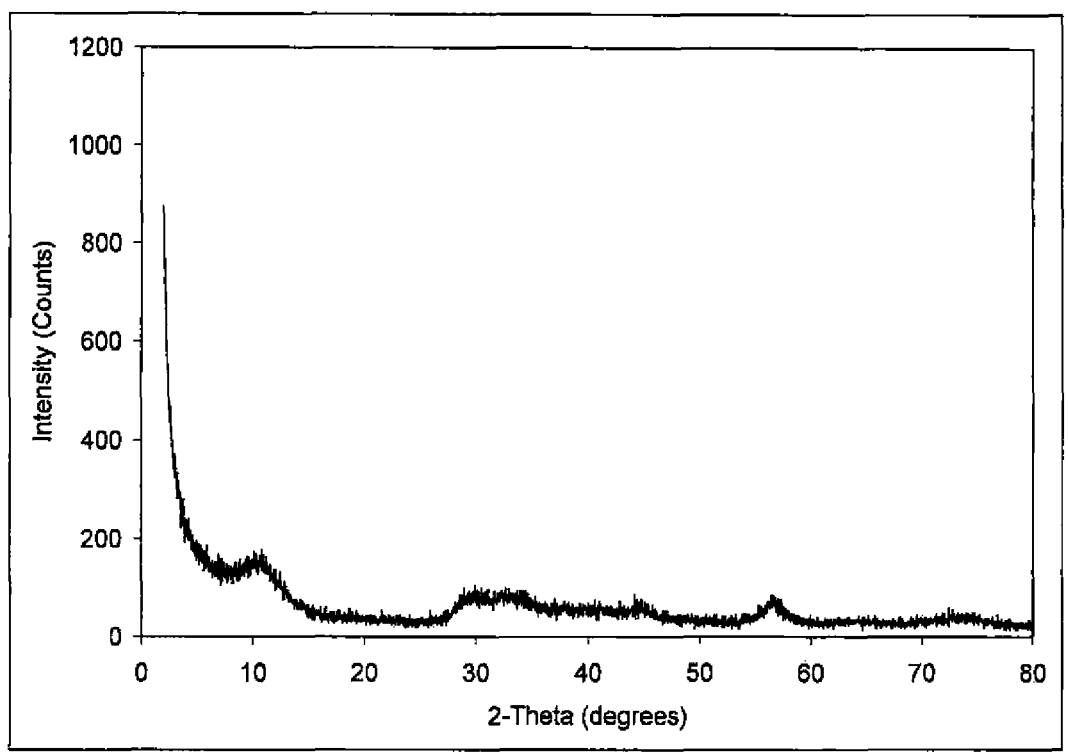
FIG. 2 illustrates an XRD of sodium titanate, showing a sodium titanate peak at 10 degrees 2 theta, and indicating that synthesis is complete.

Analysis of the reaction product by X-Ray Diffraction (XRD) can be utilized to determine whether sodium titanate synthesis is complete, and incomplete synthesis can be evidenced by remaining titanium dioxide ($TiO_2$) peaks and an absence of a sodium titanate peak at 10 degrees 2 theta. FIG. 1 illustrates an XRD plot of titanium dioxide ($TiO_2$), showing the peaks associated therewith. FIG. 2 illustrates an XRD of sodium titanate, showing a sodium titanate peak at 10 degrees 2 theta, and indicating that synthesis is complete.

After the reaction is complete, the process can also include additional steps, including, but not limited to, adjusting the pH of the reaction product with sulfuric acid or another suitable mineral acid, rinsing the reaction product, and drying the rinsed reaction product. The drying can be accomplished by any suitable manner, and can be at a temperature of at least about 80° C.

The resulting sodium titanate product can be a solid, such as a powder or granule. Products in powder form preferably have an average particle size ranging from about 1 micron to about 100 microns, including for example from about 20 microns to about 70 microns. In some examples, the average particle size can be about 25 microns, about 30 microns, about 35 microns, about 40 microns, about 45 microns, about 50 microns, about 55 microns, about 60 microns, or about 65 microns. Products in granular form preferably have an average particle size ranging from 1 mm to 4 mm, including but not limited to average particle sizes of about 2 mm, or about 3 mm. It should be understood that the size of the individual particles produced by the process will vary to some extent, and will include individual particle sizes below and above the average particle size. Additionally, the sodium titanate can have a high surface area which can be up to about 200 $m^2/g$, or greater than 200 $m^2/g$. In one example, the surface area can be from about 150 $m^2/g$ to about 350 $m^2/g$.

In one example, sodium titanate can be synthesized in accordance with the following reaction formula:

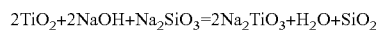
$$2TiO_2+2NaOH+Na_2SiO_3=2Na_2TiO_3+H_2O+SiO_2$$

In the formula presented above, the source of titanium is a titanium dioxide, which can be solid nano-crystalline titanium dioxide. The source of sodium oxide includes sodium hydroxide and sodium silicate. The sodium titanate can be synthesized by forming a reaction mixture that includes the titanium dioxide, sodium hydroxide, sodium silicate, and a solvent such as water. The synthesis procedure can then include reacting the components of the reaction mixture under suitable conditions to produce the sodium titanate.

If desired, additional components may be added to the reaction product. For example, a binder, such as, for example, sodium silicate, can be added to the reaction product, particularly in examples where the sodium titanate is going to be utilized as an ion exchange product composition. One example of an ion exchange product composition comprising sodium titanate synthesized in accordance with the methods provided herein can include from about 20 wt % to about 90 wt % sodium titanate, from about 0 wt % to about 60 wt % sodium hydroxide, from about 0 wt % to about 20 wt % sodium silicate, from about 0 wt % to about 10 wt % sodium sulfate, and from about 5 wt % to about 10 wt % water. Preferably, an ion exchange product composition can include at least about 75 wt % sodium titanate, including but not limited to about 80 wt % sodium titanate, or about 85 wt % sodium titanate. In such an example the ion exchange product composition can include up to about 10 wt % sodium silicate as a binder, up to about 5 wt % sodium sulfate, and up to about 10% residual water.

Ion exchange products including sodium titanate synthesized in accordance with the methods provided herein can be used as ion exchange media for removing contaminants from water. For example, the sodium titanate ion exchange products can be utilized to remove contaminants such as metals from a water source, such as drinking water and ground water, as well as industrial process streams, effluent streams and other waste water. Table 1 below provides a list of various metals that can be removed from water by sodium titanate ion exchange products. Removal of such metals can include in any amount of reduction in the amount of the metal contained in the water after being treated with the ion exchange product as compared to the amount of the same metal that was present in the water prior to the treatment. Preferably, the sodium titanate can remove a substantial portion of, or substantially all of, a metal from the water during treatment.

A process of water treatment utilizing a sodium titanate ion exchange medium including sodium titanate synthesized in accordance with the methods provided herein can include providing water from a water source to a treatment container that includes the sodium titanate ion exchange medium, and passing the water through the sodium titanate ion exchange medium to remove one or more contaminants.

Example 1

Sodium Titanate Synthesis

Preparation

A solution of 100 pounds of 40 wt % sodium silicate in water was added to a heated vessel having a temperature of about 85° C. About 350 pounds of a 50 wt % solution of sodium hydroxide in water to the sodium silicate solution to form a solution of sodium silicate and sodium hydroxide.

In a separate vessel, 750 pounds of a slurry of anatase phase titanium dioxide ($TiO_2$) in water having about 35 wt % $TiO_2$ (11.18 lbs/gallon) was neutralized with a solution of sodium hydroxide and water having about 50 wt % sodium hydroxide to form a neutralized slurry having a pH from about 6.0 to about 7.0, the neutralized slurry was agitated to maintain the suspension.

Product Production

Neutralized slurries as described above were subjected to reaction conditions that included varying reaction temperatures and reaction periods.

In each instance, the neutralized slurry was added to the solution of sodium silicate and sodium hydroxide with high shear mixing to form a reaction mixture. Under high shear mixing, the temperature of the reaction mixture was raised to a temperature from about 80° C. to about 110° C. Specifically, for individual runs, the reaction temperature was about 80° C., about 85° C., about 90° C., about 95° C., about 100° C., about 105° C., and about 110° C. The reaction temperature and high shear mixing were maintained for a reaction period that was between 2 hours and 30 hours. Specifically, for individual runs, the reaction period was 2 hours, 4 hours, 6 hours, 12 hours, 24 hours, and 30 hours.

After the reaction period in each run, the pH of the reaction product was reduced to from about 9.0 to about 11.0 using a solution of sulfuric acid. Alternatively, other suitable mineral acids can be utilized, including, for example hydrochloric acid. The reaction product was then de-watered while rinsing with water to reduce residual salts, and then re-slurried with water.

For each run, sodium silicate was then added in an amount of about 5 wt % to about 20 wt % of the total weight of the product composition to act as binder. The product was then dried to produce the final ion exchange product composition, which was a powder sodium titanate having a target particle size ranging from about 20 microns to about 50 microns.

Example 2

Lead Reduction Using Sodium Titanate Ion Exchange Media

Figure 3:
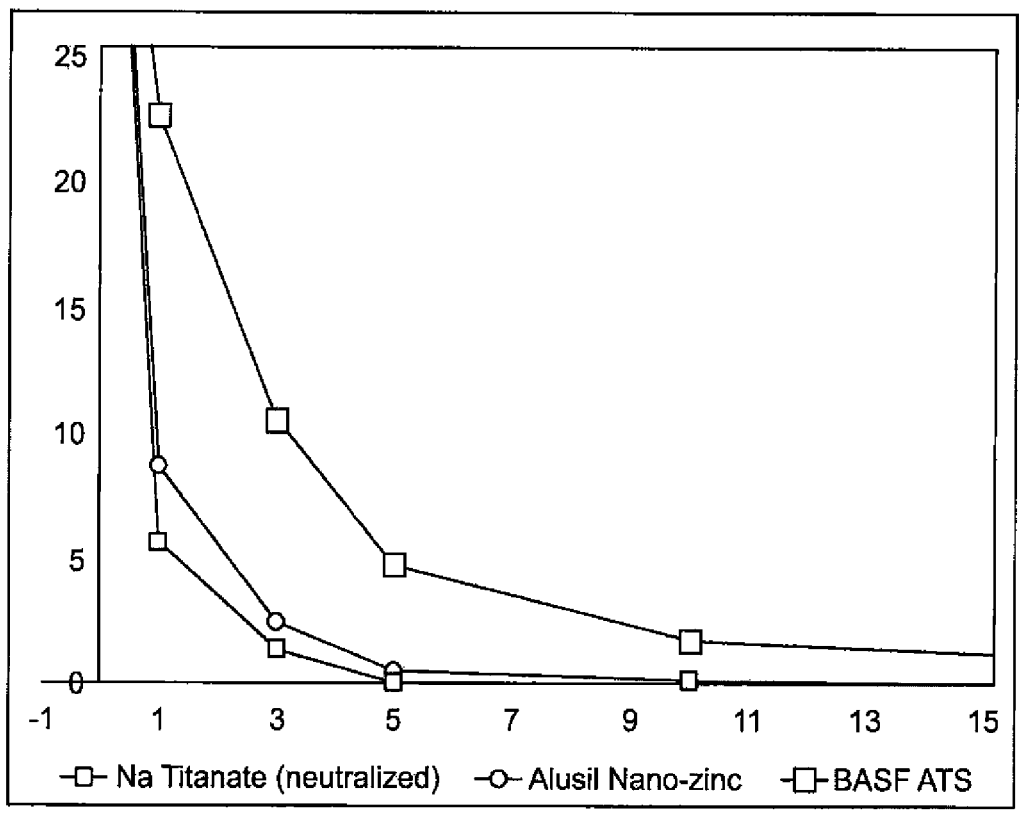
FIG. 3 illustrates a graph of lead removal as a function of time for different types of ion exchange media.

In laboratory analyses, the sodium titanate ion exchange media prepared using the methods described herein exhibited better kinetic performance and total capacity when compared to two conventional products. In particular, 3 liters of challenge water were provided for treatment to each of three treatment vessels. The water contained lead in an amount of 50 ppm. To each treatment vessel, 1 dry gram of ion exchange medium was added. The first ion exchange medium was a sodium titanate ion exchange medium prepared in accordance with the procedure described in Example 1 above. The second ion exchange medium was a commercially available ceramic (titanium silicate) ion exchange medium known as ATS, available from BASF. The third ion exchange medium was a commercially available zinc containing ion exchange medium known as Alusil™ Nano-zinc. The level of lead in the water over time for each ion exchange medium is shown in the graph of FIG. 3. The data points for the first ion exchange medium are shown as squares, the data points for the second ion exchange medium are shown as triangles, and the data points for the third ion exchange medium are shown as "x"s.

As can be seen in FIG. 3, the sodium titanate ion exchange medium taught herein removed more lead in a shorter period of time than either of the other two ion exchange media.

Figure 4:
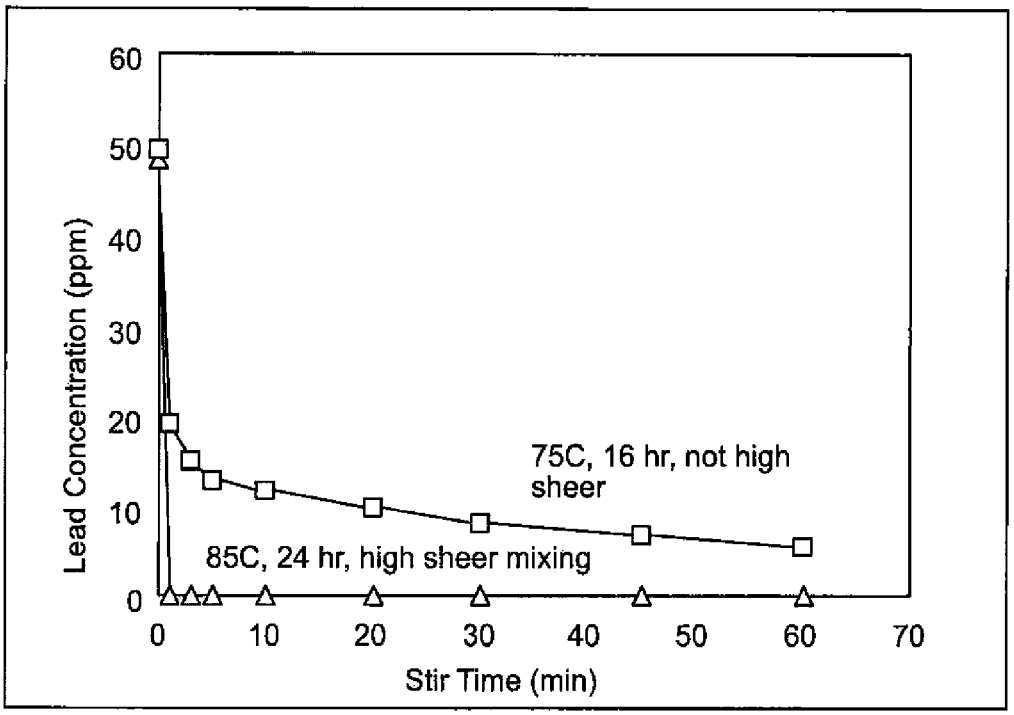
FIG. 4 illustrates a graph of lead removal as a function of time for sodium titanate ion exchange media produced at varying reaction temperatures, reaction periods and types of mixing.

Laboratory testing for lead removal showed less favorable results when the titanate synthesis was performed outside of the preferred conditions with respect to temperature, time, and high shear mixing. For example, FIG. 4 shows less favorable results when high shear mixing is not used. FIG. 4 also indicates that higher reaction temperature and longer reaction time may also contribute to more favorable results.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. A method of synthesizing sodium titanate, the method comprising the steps of:
    providing at least one source of titanium that includes nano-crystalline titanium having a mean primary crystallite diameter of about 1 nm to about 30 nm;
    providing at least one source of sodium oxide;
    forming a reaction mixture that includes the at least one source of titanium and the at least one source of sodium oxide in a suitable solvent; and
    reacting the components of the reaction mixture to produce a reaction product that includes sodium titanate having a particle size ranging from 1 micron to 100 microns.

2. The method of claim 1, wherein the nano-crystalline titanium has a mean primary crystallite diameter of about 1 nm to about 10 nm.

3. The method of claim 1, wherein the nano-crystalline titanium is a titanium oxide or a titanium hydroxide.

4. The method of claim 3, wherein the nano-crystalline titanium is titanium dioxide.

5. The method of claim 1, wherein the at least one source of sodium oxide is selected from the group consisting of sodium hydroxide, sodium silicate, and alkali metal hydroxide.

6. The method of claim 1, wherein the sodium titanate has an average particle size from about 20 microns to about 70 microns.

7. The method of claim 1, wherein the sodium titanate has a surface area of at least 200 $m^2/g$.

8. The method of claim 1, wherein the step of reacting comprises reacting the components of the reaction mixture for a reaction period having a length of time from about 1 hours to about 60 hours.

9. The method of claim 1, wherein the step of reacting comprises heating the reaction mixture to a temperature from about 50° C. to about 140° C.

10. The method of claim 1, wherein the step of reacting comprises stirring the reaction mixture with high shear mixing.

11. The method of claim 1, wherein the step of reacting comprises:
    reacting the components of the reaction mixture for a reaction period having a length of time from about 1 hours to about 60 hours;
    heating the reaction mixture to a temperature from about 50° C. to about 140° C. for the reaction period; and
    stirring the reaction mixture with high shear mixing for the reaction period.

12. The method of claim 1, wherein the method further comprises:
    adjusting the pH of the reaction product with an acid;
    rinsing the reaction product with deionized water; and
    drying the reaction product.

13. An ion exchange medium comprising sodium titanate produced by the method of claim 1.

14. A method of removing contaminants from water, the method comprising the steps of:
    providing an ion exchange medium to a treatment vessel, the ion exchange medium comprising sodium titanate synthesized by:
        providing at least one source of titanium that includes nano-crystalline titanium having a mean primary crystallite diameter of about 1 nm to about 30 nm;
        providing at least one source of sodium oxide;
        forming a reaction mixture that includes the at least one source of titanium and the at least one source of sodium oxide in a suitable solvent; and
        reacting the components of the reaction mixture to produce a reaction product that includes sodium titanate having a particle size ranging from 1 micron to 100 microns;

providing water from a water source to the treatment vessel; and passing the water through the sodium titanate ion exchange medium in the treatment vessel to remove at least one contaminant.

15. The method of claim 14, wherein the nano-crystalline titanium is a titanium oxide or a titanium hydroxide.

16. The method of claim 15, wherein the nano-crystalline titanium is titanium dioxide.

17. The method of claim 14, wherein the sodium titanate has an average particle size from about 20 microns to about 70 microns.

18. The method of claim 14, wherein the sodium titanate has a surface area of at least 200 $m^2/g$.

19. The method of claim 14, wherein the at least one contaminant comprises a metal.

20. The method of claim 14, wherein the metal is lead.

* * * * *